United States Patent
Mahamuni et al.

(10) Patent No.: US 10,362,090 B2
(45) Date of Patent: Jul. 23, 2019

(54) AUTOMATING A PROCESS ASSOCIATED WITH A WEB BASED SOFTWARE APPLICATION

(71) Applicant: Tata Consultancy Services Limited, Mumbai, Maharashtra (IN)

(72) Inventors: Ravi Hanmant Mahamuni, Pune (IN); Rohit Saxena, Pune (IN); Sumesh R. Manjunath, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 475 days.

(21) Appl. No.: 14/733,784

(22) Filed: Jun. 8, 2015

(65) Prior Publication Data

US 2015/0381703 A1 Dec. 31, 2015

(30) Foreign Application Priority Data

Jun. 25, 2014 (IN) .......................... 2053/MUM/2014

(51) Int. Cl.
*H04L 29/08* (2006.01)
(52) U.S. Cl.
CPC ............ *H04L 67/025* (2013.01); *H04L 67/22* (2013.01)
(58) Field of Classification Search
CPC .............................. H04L 67/025; H04L 67/22
USPC ........................................................ 709/217
See application file for complete search history.

(56) References Cited

U.S. PATENT DOCUMENTS

| | | | | | |
|---|---|---|---|---|---|
| 6,157,940 | A | * | 12/2000 | Marullo .................... | G06F 9/52 703/27 |
| 2004/0111488 | A1 | * | 6/2004 | Allan ................ | G06F 17/30899 709/217 |
| 2009/0133000 | A1 | * | 5/2009 | Sweis ........................ | G06F 8/74 717/124 |
| 2011/0289117 | A1 | * | 11/2011 | Agrawal ................ | G06Q 10/00 707/802 |

(Continued)

OTHER PUBLICATIONS

Kruger et al. "System for a model based analysis of user interaction patterns within web-applications". 2011 IEEE International Conference on Systems, Man, and Cybernetics (SMC). 2011. https://doi.org/10.1109/ICSMC.2011.6083835 (Year: 2011).*

(Continued)

*Primary Examiner* — Brian Whipple
*Assistant Examiner* — James Ross Hollister
(74) *Attorney, Agent, or Firm* — Knobbe, Martens, Olson & Bear, LLP

(57) ABSTRACT

Disclosed is a method and system for automating a process associated with a web based software application. The method comprises capturing one or more activities performed by a user for the process. An activity of the one or more activities corresponds to one or more events. An event of the one or more events indicates a means of interaction of the user with the web based software application. The method further comprises extracting metadata associated with each activity of the one or more activities. The method comprises sensing a response of the web based software application for each activity performed by the user. The method comprises generating a rule for each activity based on the metadata extracted, the one or more events, and the response. The method further comprises configuring a script for the process by combining rules generated for the one or more activities.

9 Claims, 4 Drawing Sheets

(56) References Cited

U.S. PATENT DOCUMENTS

| | | | |
|---|---|---|---|
| 2011/0307868 A1 | 12/2011 | Schwartz | |
| 2012/0117569 A1* | 5/2012 | Fogel | G06Q 10/0633 |
| | | | 718/102 |
| 2013/0097586 A1* | 4/2013 | Chandra | G06F 11/3684 |
| | | | 717/124 |
| 2013/0104041 A1* | 4/2013 | Seshagiri | G06F 11/3414 |
| | | | 715/704 |
| 2013/0132833 A1* | 5/2013 | White | G06F 3/048 |
| | | | 715/704 |
| 2013/0136253 A1* | 5/2013 | Liberman Ben-Ami | |
| | | | H04M 3/5191 |
| | | | 379/265.09 |
| 2013/0232245 A1* | 9/2013 | Antosz | G06F 8/10 |
| | | | 709/222 |
| 2013/0263156 A1* | 10/2013 | Nakagawa | G06F 9/542 |
| | | | 719/318 |
| 2013/0347003 A1* | 12/2013 | Whitmore | G06Q 10/06 |
| | | | 718/108 |
| 2016/0070560 A1* | 3/2016 | Chase | G06F 8/65 |
| | | | 717/170 |

OTHER PUBLICATIONS

"Selenium Documentation Release 1.0", http://oss.infoscience.co.jp/seleniumhq/docs/book/Selenium_Documentation.pdf, Feb. 2010 (Year: 2010).*

Richard Atterer, Monika Wnuk, Albrecht Schmidt; "Knowing the user's every move: user activity tracking for website usability evaluation and implicit interaction"; 2006.

* cited by examiner

AUTOMATING A PROCESS ASSOCIATED WITH A WEB BASED SOFTWARE APPLICATION

CROSS REFERENCE TO RELATED APPLICATIONS

This Application claims the benefit of Indian Application No. 2053/MUM/2014, filed Jun. 25, 2014, and titled "AUTOMATING A PROCESS ASSOCIATED WITH A WEB BASED SOFTWARE APPLICATION," and assigned to the assignee hereof. The disclosure of this prior application is considered part of this application, and is hereby incorporated by reference in its entirety.

TECHNICAL FIELD

The present subject matter described herein, in general, relates to automating a process, and more particularly to automating a process associated with a web based software application.

BACKGROUND

The manual intervention required in software processes/applications has always been a peculiar concern. Even today's IT world is not completely automatic. Manual intervention is still needed for a variety of reasons. Thus, substitution of manual intervention with some effective solution is a challenging and a demanding area of research.

Manual intervention is largely required in cases where a user logs into a third party application, execution of test cases, e-commerce transactions and the like. Existing solutions configured to automate the software processes need a readymade process flow to make the system automatic. Creation of the process flow in itself requires human intervention and needs high level of technical understanding.

Existing automation processes requires a human to manually mention fields on which action may be taken. If human intervention is required during the process, existing solutions are unable to handle it. To change the sequence of steps involved, the process has to be run again. The existing solutions also does not adapt themselves to any change in the application. The handling of private or sensitive content while proposing an automatic solution is also a difficult task.

SUMMARY

This summary is provided to introduce aspects related to systems and methods for automating a process associated with a web based software application and the aspects are further described below in the detailed description. This summary is not intended to identify essential features of the claimed subject matter nor is it intended for use in determining or limiting the scope of the claimed subject matter.

In one implementation, a method for automating a process associated with a web based software application is disclosed. The method comprises, capturing, by a processor, one or more activities performed by a user for the process associated with the web based software application. An activity of the one or more activities corresponds to one or more events. An event of the one or more events indicates a means of interaction of the user with the web based software application. The method further comprises extracting, by the processor, metadata associated with each activity of the one or more activities. The method comprises sensing a response of the web based software application for each activity performed by the user. The method further comprises generating a rule for each activity based on the metadata extracted, the one or more events, and the response. The method further comprises configuring, by the processor, a script for the process by combining rules generated for the one or more activities. The script comprises steps to automate the process.

In one implementation, a system for automating a process associated with a web based software application is disclosed. The system comprises a processor and a memory coupled to the processor for executing a plurality of modules present in the memory. The plurality of modules comprises a capturing module, an extracting module, a sensing module, a generating module, and a configuring module. The capturing module captures one or more activities performed by a user for the process associated with the web based software application. An activity of the one or more activities corresponds to one or more events. An event of the one or more events indicates a means of interaction of the user with the web based software application. The extracting module extracts metadata associated with each activity of the one or more activities. The sensing module senses a response of the web based software application for each activity performed by the user. The generating module generates a rule for each activity based on the metadata extracted, the one or more events, and the response. The configuring module configures a script for the process by combining rules generated for the one or more activities. The script comprises steps to automate the process.

In one implementation, a non-transitory computer readable medium embodying a program executable in a computing device for automating a process associated with a web based software application is disclosed. The program comprises a program code for capturing one or more activities performed by a user for the process associated with the web based software application. An activity of the one or more activities corresponds to one or more events. An event of the one or more events indicates a means of interaction of the user with the web based software application. The program further comprises a program code for extracting metadata associated with each activity of the one or more activities. The program further comprises a program code for sensing a response of the web based software application for each activity performed by the user. The program comprises a program code for generating a rule for each activity based on the metadata extracted, the one or more events, and the response. The program also comprises a program code for configuring a script for the process by combining rules generated for the one or more activities. The script comprises steps to automate the process.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Systems and methods for automating a process associated with a web based software application are described. The present subject matter discloses a mechanism for automating the process associated with the web based software application. In order to automate the process, one or more activities performed by a user for the process may be captured. An activity of the one or more activities may correspond to one or more events. An event of the one or more events may indicate a means of interaction of the user with the web based software application.

After capturing the one or more activities, metadata associated with each activity may be extracted. The metadata may comprise element ID, field name, XPath, field type, and event type of an HTML field on a web page of the web based application. Further, for each activity performed by the user, a response of the web based software application may be sensed. The metadata extracted, the response sensed, and the one or more events may be used for generating a rule for each activity. Further, in order to automate the process, a script may be configured for the process by combining rules generated for the one or more activities. The script may comprise steps to automate the process.

While aspects of described system and method for automating a process associated with a web based software application may be implemented in any number of different computing systems, environments, and/or configurations, the embodiments are described in the context of the following exemplary system.

Figure 1:
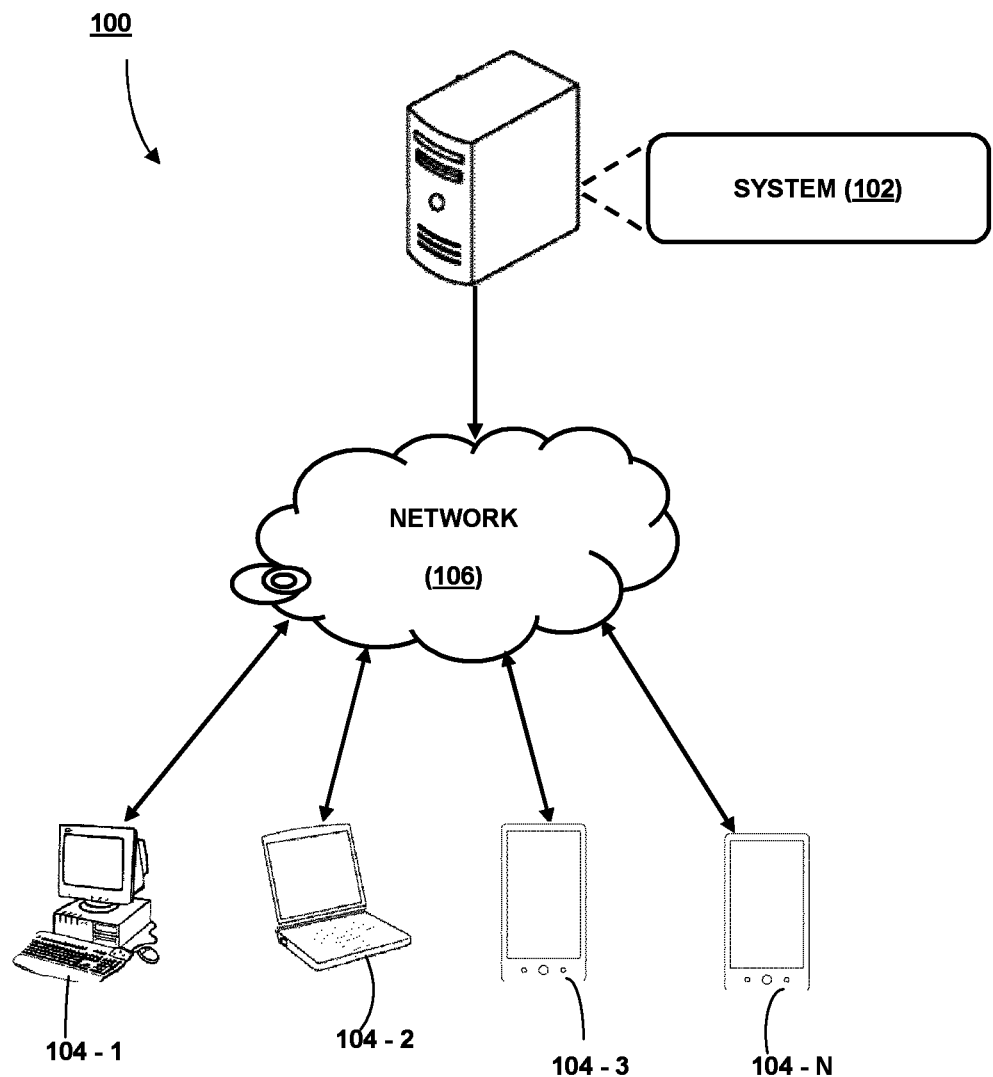
FIG. 1 illustrates a network implementation of a system for automating a process associated with a web based software application, in accordance with an embodiment of the present subject matter.

Referring now to FIG. 1, a network implementation 100 of a system 102 for automating a process associated with a web based software application is illustrated, in accordance with an embodiment of the present subject matter. In one embodiment, the system 102 may automate the process associated with the web based software application.

Although the present subject matter is explained considering that the system 102 is implemented on a server, it may be understood that the system 102 may also be implemented in a variety of computing systems, such as a laptop computer, a desktop computer, a notebook, a workstation, a mainframe computer, a server, a network server, and the like. In one implementation, the system 102 may be implemented in a cloud-based environment. It will be understood that the system 102 may be accessed by multiple users through one or more user devices 104-1, 104-2 . . . 104-N, collectively referred to as user devices 104 hereinafter, or applications residing on the user devices 104. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
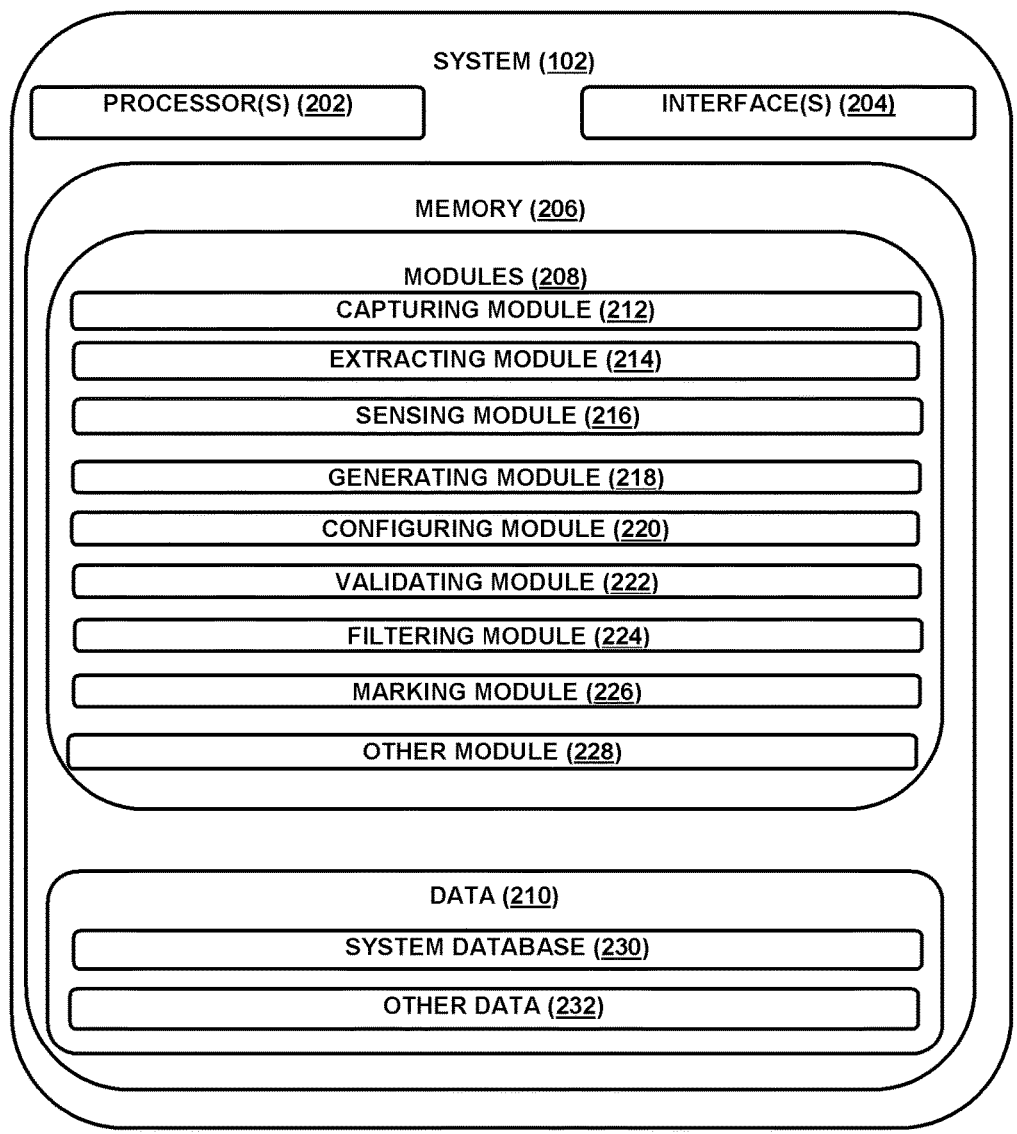
FIG. 2 illustrates the system, in accordance with an embodiment of the present subject matter.

Referring now to FIG. 2, the system 102 is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with a user directly or through the client devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks, functions or implement particular abstract data types. In one implementation, the modules 208 may include a capturing module 212, an extracting module 214, a sensing module 216, a generating module 218, a configuring module 220, a validating module 222, a filtering module 224, a marking module 226, and other modules 228. The other modules 228 may include programs or coded instructions that supplement applications and functions of the system 102.

The data 210, amongst other things, serves as a repository for storing data processed, received, and generated by one or more of the modules 208. The data 210 may also include a system database 230, and other data 232. The other data 232 may include data generated as a result of the execution of one or more modules in the other modules 228.

In one implementation, at first, a user may use the client device 104 to access the system 102 via the I/O interface 204. Alternatively, the system 102 may be accessed by a user directly with the help of the I/O interface 204. The user may register themselves using the I/O interface 204 in order to use the system 102. The working of the system 102 may be explained in detail in FIG. 3 explained below. The system 102 may be used for automating a process associated with a web based software application. The process may comprise any process executed on the web based software application. For example, the process may be a login process, an online transaction process related to net banking, e-commerce transactions, and online reservation process. Further, the process may span across multiple web pages or windows. For example, an e-commerce transaction process may span across multiple web pages. The multiple web pages may comprise a products category web page, payment web page, and payment confirmation web page.

Figure 3:
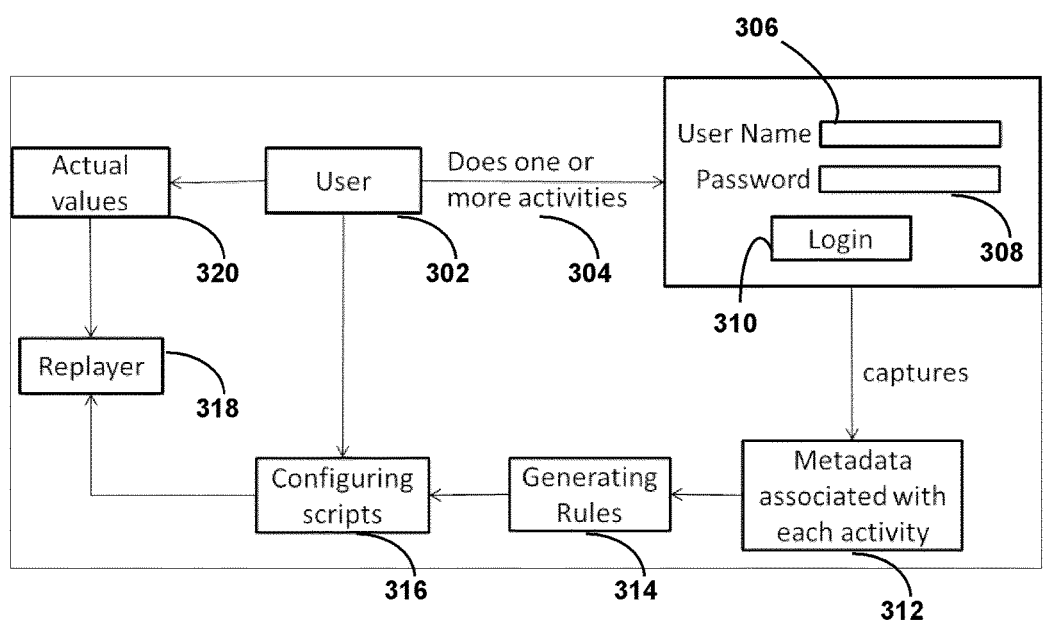
FIG. 3 illustrates a flow for automating a process associated with a web based software application, in accordance with an embodiment of the present subject matter.

The FIG. 3 illustrates a flow for automating the process associated with the web based software application. The process depicted in the FIG. 3 may be considered to be the login process for the web based software application. In order to automate the process, the system 102, at first, may employ the capturing module 212. The capturing module 212 may capture one or more activities 304 performed by a user 302 for the process associated with the web based software application. The one or more activities 304 may comprise a mouse click, a key press, a key release, a screen touch, a scroll, navigation from a web page to another web page, and the like. For example, for the login process, the one or more activities 304 performed by the user 302 may comprise the key press and the key release for entering the username 306 and the password 308, and the mouse click for clicking on a login button 310.

Further, an activity of the one or more activities 304 may correspond to one or more events. An event of the one or more events may indicate a means of interaction of the user with the web based software application. For example, for the activity of the key press, the event may be 'onkeyup'. Similarly, for the activity of the mouse click, the event may be 'onclick'.

After capturing the one or more activities 304 performed by the user 302, the system 102 may employ the extracting module 214. The extracting module 214 may extract metadata 312 associated with each activity of the one or more activities. The metadata 312 extracted may comprise element ID, field name, XPath, field type, and event type of an HTML field on a web page of the web based application. For example, referring again to the FIG. 3, consider that the process is the login process. The user may enter a customer id and a password in order to login. For the activity of entering the customer id, the metadata 312 extracted may be,
Event Type: onkeyup
Element Type: text
Field Type: id
Field Value: ct100_txtUserid Similarly, for the activity of entering the password, the metadata 312 extracted may be,
Event Type: onkeyup
Element Type: password
Field Type: id
Field Value: ct100_txtPassword Moreover, for the activity of clicking on a login button, the metadata 312 extracted may be,
Event Type: onclick
Element Type: image
Field Type: XPath
Field Value: html/body/form/center/div/table/tbody/tr/td[3]/table/tbody/tr[3]/td/input[2]

After extracting the metadata 312, the system 102 may employ the sensing module 216. The sensing module 216 may sense a response of the web based software application for each activity performed by the user. For example, consider that the process may be, submitting a web form. The web form may comprise a plurality of fields. The user 302 may be required to enter an address in one of the plurality of fields. Specifically, the user 302 may select a country from a list of countries. For the country selected the web form may display another field comprising a list of states only for the country selected. The response of the web based software application for the activity of selecting the country from the list of countries may be displaying the list of states for the country selected. Thus, the response of the web based software application for the activity of selecting the country may be sensed by the sensing module 216.

The system 102 may further employ the filtering module 224 and the marking module 226. The filtering module 224 may filter redundant events of the one or more events associated with the activity. For example, the redundant events may comprise redundant click events, an un-entered value in a field, a re-entered value in the field, and the like. The marking module 226 may mark, via a sensitive field flag, one or more HTML fields on a web page of the web based software application as sensitive fields. The sensitive fields may comprise a password field, a Social Security Number (SSN) field, and the like. Further, the marking module 226 may mark, via a human intervention flag, one or more steps of the process where human intervention may be required.

After sensing the response, the system 102 may employ the generating module 218. The generating module 218 may generate a rule 314 for each activity 304 based on the metadata 312 extracted, the one or more events, and the response. Referring again to the example of the login process, for the activity of the entering the customer id, the rules 314 generated may be,
1, Customer ID, ONKEYUP, text, ID, ct100_txtUserid, false, false . . . Rule 1

Similarly, for the activity of entering the password, the rule generated may be,
2, Password, ONKEYUP, password, ID, ct100_txtPassword, True, False . . . Rule 2

Moreover, for the activity of the clicking on the login button the rule generated may be,
3, Login, ONCLICK, Image, XPath, html/body/form/center/div/table/tbody/tr/td[3]/table/tbody/tr[3]/td/input[2], False, False The rules 314 generated by the generating module 218 may have plurality of attributes. The plurality of attributes may comprise order number, display name, event type, element type, field type, field value, sensitive field flag, and human intervention flag. The order number indicates the order in which the activity corresponding to the rule is performed. The order number may be further modified to indicate the order in which the rule may be executed.

The display name of the rules 314 may be any human recognizable name. The display name may enable the user to identify each rule easily without a need of knowing technical details about the rule. The event type may indicate the type of the event. For example, the event type may be 'onkeyup' or 'onclick'. Further, the element type may indicate the type of the element of the webpage of the web based software application. For example, the element type may be text, password, or image. The field type may indicate the type of the form field on the web page. For example, the field type may be id or XPath. The field value may indicate the value entered by the user while performing the activity. The field value may be 'ct100_txtUserid' for the activity of entering the customer id. Similarly, the filed value may be 'ct100_txtPassword' for the activity of entering the password and 'html/body/form/center/div/table/tbody/tr/td[3]/table/tbody/tr[3]/td/input[2]' for the activity of clicking on the login button.

Further, the marking module 226, via the sensitive field flag, may indicate if the field accessed while performing the activity is the sensitive field. For example, for the activity of entering the password, the field may be marked as the sensitive field by the marking module 226. Thus, the sensitive field flag may be set for the rule. Furthermore, the marking module 226, via the human intervention flag, may indicate whether execution of the rule may require a human intervention. For example, for CAPTCHA, the user may be required to enter a distorted text. Further, in case of a one time password human intervention may be required. Therefore, the marking module 226 may set the human intervention flag corresponding to the one time password field indicating requirement of human intervention during execution of the onetime password field. In an embodiment, execution of the rules requiring such human interventions may set the human intervention flag. Similarly, depending upon the human intervention flag, any process spanning across one or more web pages may be stopped at a specific step in order to allow the human intervention step, and once the human intervention step is performed, next step following the human intervention step is performed automatically depending upon the rules and the scripts configured.

Further, the rule may be a click type rule, KeyUp type rule, and a combo box type rule. For the KeyUp type rule, the generating module 218 may use the element ID to retrieve the element from the Document Object Model (DOM) layer. Similarly, for the click type rule, the generating module 218 may use the element ID or XPath to retrieve the element. For the combo box type rule, the generating module 218 may use the element ID to retrieve the element and retrieve a plurality of combo values and a plurality of technical values associated with the plurality of combo values. In one example, a combo box defining geographical languages may comprise combo values in form of languages across the globe, e.g. English, French, German, and the like. Additionally, corresponding to each combo value in form of a specific language, a technical value may be generated, e.g. EN, FR, DE, and the like. The combo box type rule may comprise a list displaying the combo values to the user. The user may select a combo value of the list of combo values. The combo value of the list of combo values may have the corresponding technical value.

After generating rule for each activity, the system 102 may employ the configuring module 220. The configuring module 220 may configure a script 316 for the process by combining rules 314 generated for the one or more activities. The script 316 may comprise steps to automate the process. The rules 314 may be combined in the order of the one or more activities 304 performed by the user 302. The order number for each rule may indicate the order in which the activity corresponding to the rule may be performed.

Referring again to the FIG. 3, illustrating the example of the login process, the rules 314 for each activity may be combined to configure the script 316,
1, Customer ID, ONKEYUP, text, ID, ctl00_txtUserid, false, false
2, Password, ONKEYUP, password, ID, ctl00_txtPassword, True, False
3, Login, ONCLICK, Image, XPath, html/body/form/center/div/table/tbody/tr/td[3]/table/tbody/tr[3]/td/input[2], False, False The order in which the rules 314 may be combined may be further modified based on the order of the execution of the rules 314. The order of the execution of the rules 314 may change based on the order in which the activities 304 may be performed. Therefore, if the process changes, the order in which the activities 304 may be performed may change. The rules 314 generated may be sequenced or re-arranged accordingly, thereby avoiding a necessity to re-run the process again.

After configuring the script, the system 102 may employ the validating module 222. The validating module 222 may validate the script 316 by executing the script for a consecutive access to the web based software application. The validating module 222 may use the metadata 312 extracted to execute the script 316. Based upon the validation, the script 216 configured may be replayed or executed using a Replayer 318. For each execution or relaying of the script, actual values 320 entered by the user, at each instance of the execution or replaying of the script, may be captured based upon rules associated with the script. Therefore, the validation module 222 may insert the values corresponding to each element based upon the script configured. In one example, for the click type rule, the validation module 222 may perform the click operation automatically based upon element retrieved by the generating module 218 using the corresponding element ID or XPath. Similarly, in another example, for the KeyUp type rule, the validation module 222 may insert a value corresponding to element retrieved from the Document Object Model (DOM) layer. In another example, for the combo box type rule defining the geographical languages, the validation module 218 may insert a combo value, of the plurality of combo values, selected by the user. More particularly, in this example, if the user selects a combo value in form of English language, the validation module 218 may insert the English language during execution of the script accordingly.

Figure 4:
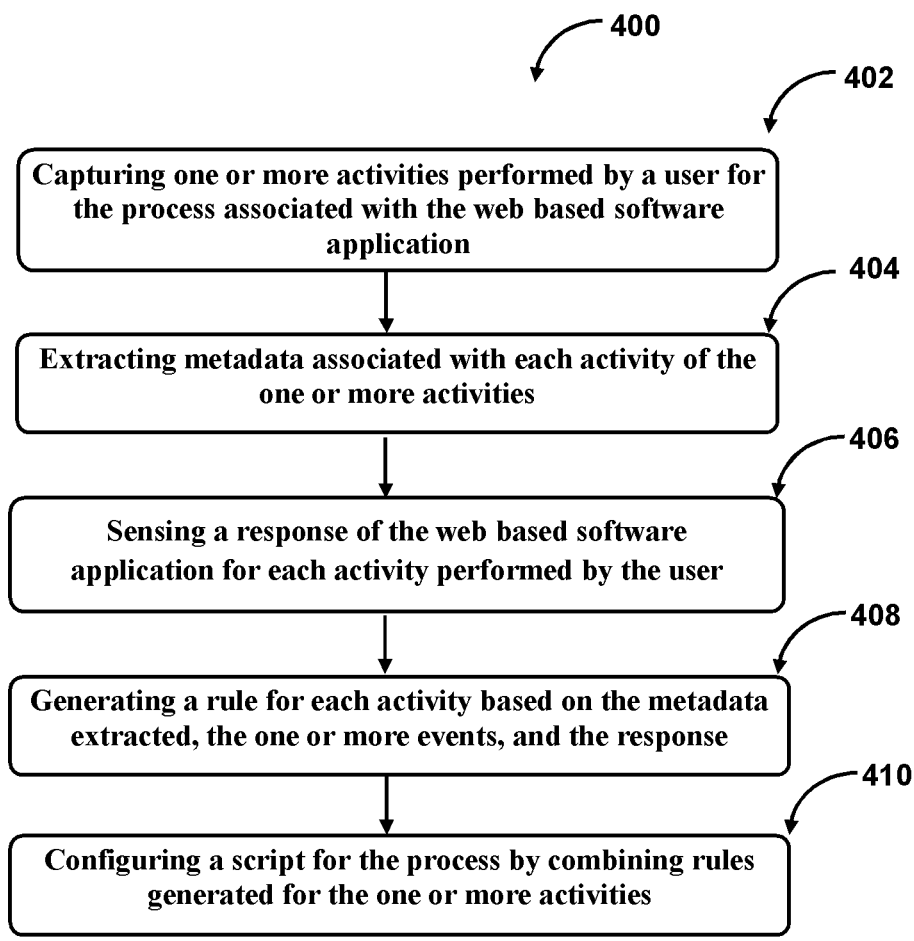
FIG. 4 shows a flowchart for illustrating a method for automating a process associated with a web based software application, in accordance with an embodiment of the present subject matter.

Referring now to FIG. 4, a method 400 for automating a process associated with a web based software application is shown, in accordance with an embodiment of the present subject matter. The method 400 may be described in the general context of computer executable instructions. Generally, computer executable instructions can include routines, programs, objects, components, data structures, procedures, modules, functions, etc., that perform particular functions or implement particular abstract data types. The method 400 may also be practiced in a distributed computing environment where functions are performed by remote processing devices that are linked through a communications network. In a distributed computing environment, computer executable instructions may be located in both local and remote computer storage media, including memory storage devices.

The order in which the method 400 is described is not intended to be construed as a limitation, and any number of the described method blocks can be combined in any order to implement the method 400 or alternate methods. Additionally, individual blocks may be deleted from the method 400 without departing from the spirit and scope of the subject matter described herein. Furthermore, the method can be implemented in any suitable hardware, software, firmware, or combination thereof. However, for ease of explanation, in the embodiments described below, the method 400 may be considered to be implemented in the above described system 102.

At block 402, one or more activities performed by a user for the process associated with the web based software application may be captured. An activity of the one or more activities may correspond to one or more events. An event of the one or more events may indicate a means of interaction of the user with the web based software application. In one implementation, the one or more activities may be captured by the capturing module 212.

At block 404, metadata associated with each activity of the one or more activities may be extracted. In one implementation, the metadata associated with each activity of the one or more activities may be extracted by the extracting module 214.

At block 406, a response of the web based software application for each activity performed by the user may be sensed. In one implementation, response of the web based software application for each activity performed by the user may be sensed by the sensing module 216.

At block 408, a rule for each activity may be generated based on the metadata extracted, the one or more events, and the response. In one implementation, the rule for each activity may be generated by the generating module 218.

At block 410, a script may be configured for the process by combining rules generated for the one or more activities. The script may comprise steps to automate the process. In one implementation, the script may be configured by the configuring module 220.

Although implementations for methods and systems for automating a process associated with a web based software application have been described in language specific to structural features and/or methods, it is to be understood that the appended claims are not necessarily limited to the specific features or methods described. Rather, the specific features and methods are disclosed as examples of implementations for automating a process associated with a web based software application.

We claim:

1. A method for automating a process associated with a web based software application, the method comprising:
    capturing, by a processor, one or more activities performed by a user for the process associated with the web based software application, and wherein an activity of the one or more activities corresponds to one or more events, and wherein an event of the one or more events indicates a means of interaction of the user with the web based software application;
    extracting, by the processor, metadata associated with each activity of the one or more activities, wherein the metadata comprises element ID, field name, XPath, field type, and event type of a HyperText Markup Language (HTML) field on a web page of the web based software application, and wherein the field type indicate the type of an the field of the webpage of the web based software application;
    marking, by the processor, one or more HTML fields on the web page of the web based software application as sensitive fields, wherein the sensitive fields comprises a password field;
    sensing a response of the web based software application for each activity performed by the user;
    generating a rule for each activity based on the metadata extracted, the one or more events, and the response, wherein the rules generated for each activity comprises a plurality of attributes, wherein the plurality of attributes comprises order number, display name, event type, element type, field type, field value, sensitive field flag, and human intervention flag, and wherein the order number is modified to indicate the order in which the rule is executed;
    setting, by the processor, the human intervention flag to indicate a requirement of human intervention during execution of a one time password field, wherein one or more processes across the webpage are stopped at a specific step to enable the human intervention;
    configuring, by the processor, a script for the process by combining rules generated for the one or more activities, wherein the script comprises steps to automate the process, further wherein each rule is combined in an order of the one or more activities performed by the user;
    automatically performing, by the processor, the previously captured one or more activities performed by a user based on the configured script; and
    validating the script by executing the script for a consecutive access to the web based software application, wherein the execution of the script inserts values corresponding to each element based upon the script configured.

2. The method of claim 1, wherein the one or more activities comprises a mouse click, a key press, a key release, a screen touch, a scroll, and navigation from a web page to another web page.

3. The method of claim 1, further comprising filtering redundant events of the one or more events associated with the activity, wherein the redundant events comprise redundant click events, an un-entered value in a field, or a re-entered value in the field.

4. The method of claim 1, wherein the rules comprises a click type rule, a keyUp rule, and a Combo Box type rule.

5. A system for automating a process associated with a web based software application, the system comprising:
    a processor; and
    a memory coupled to the processor, wherein the processor is capable of executing a plurality of modules stored in the memory, and wherein the plurality of modules comprising:
    a capturing module to capture one or more activities performed by a user for the process associated with the web based software application, and wherein an activity of the one or more activities corresponds to one or more events, and wherein an event of the one or more events indicates a means of interaction of the user with the web based software application;
    an extracting module to extract metadata associated with each activity of the one or more activities, wherein the metadata comprises element ID, field name, XPath, field type, and event type of a HyperText Markup Language (HTML) field on a web page of the web based software application, and wherein the field type indicate the type of the field of the webpage of the web based software application;
    a sensing module to sense a response of the web based software application for each activity performed by the user;
    a generating module to generate a rule for each activity based on the metadata extracted, the one or more events, and the response, wherein the rules generated for each activity comprises a plurality of attributes, wherein the plurality of attributes may comprise order number, display name, event type, element type, field type, field value, sensitive field flag, and human intervention flag, and wherein the order number is modified to indicate the order in which the rule is executed;
    a configuring module to configure a script for the process by combining rules generated for the one or more activities, wherein the script comprises steps to automate the process, further wherein each rule is combined in an order of the one or more activities performed by the user;

a marking module to mark one or more HTML fields on the web page of the web based software application as sensitive fields, wherein the sensitive fields comprise a password field, wherein the marking module is configured to set the human intervention flag to indicate a requirement of human intervention during execution of a one time password field, wherein one or more processes across the webpage are stopped at a specific step to enable the human intervention and to automatically perform the previously captured one or more activities performed by a user based on the configured script; and a validating module to validate the script by executing the script for a consecutive access to the web based software application, wherein the execution of the script inserts values corresponding to each element based upon the script configured.

6. The system of claim 5, wherein the one or more activities comprises a mouse click, a key press, a key release, a screen touch, and navigation from a web page to another web page.

7. The system of claim 5, wherein the plurality of modules further comprising a filtering module to filter redundant events of the one or more events associated with the activity, wherein the redundant events comprise redundant click events, an un-entered value in a field, or a re-entered value in the field.

8. The system of claim 5, wherein the rules comprises a click type rule, a keyUp rule, and a Combo Box type rule.

9. A non-transitory computer readable medium embodying a program executable in a computing device for automating a process associated with a web based software application, the program comprising:

a program code for capturing one or more activities performed by a user for the process associated with the web based software application, and wherein an activity of the one or more activities corresponds to one or more events, and wherein an event of the one or more events indicates a means of interaction of the user with the web based software application;

a program code for extracting metadata associated with each activity of the one or more activities, wherein the metadata comprises element ID, field name, XPath, field type, and event type of a HyperText Markup Language (HTML) field on a web page of the web based software application, and wherein the field type indicate the type of the field of the webpage of the web based software application;

a program code for marking one or more HTML fields on the web page of the web based software application as sensitive fields, wherein the sensitive fields comprises a password field;

a program code for sensing a response of the web based software application for each activity performed by the user;

a program code for generating a rule for each activity based on the metadata extracted, the one or more events, and the response, wherein the rules generated for each activity comprises a plurality of attributes, wherein the plurality of attributes may comprise order number, display name, event type, element type, field type, field value, sensitive field flag, and human intervention flag, and wherein the order number is modified to indicate the order in which the rule is executed;

a program code for setting the human intervention flag to indicate a requirement of human intervention during execution of a one time password field, wherein one or more processes across the webpage are stopped at a specific step to enable the human intervention;

a program code for configuring a script for the process by combining rules generated for the one or more activities, wherein the script comprises steps to automate the process, further wherein each rule is combined in an order of the one or more activities performed by the user;

a program code for automatically performing the previously captured one or more activities performed by a user based on the configured script; and a program code for validating the script by executing the script for a consecutive access to the web based software application, wherein the execution of the script inserts values corresponding to each element based upon the script configured.

* * * * *